Aug. 19, 1969 S. W. FOOR 3,462,054

MULTIPLE STRIP LEADER

Filed March 20, 1967

SANFORD WAYNE FOOR
INVENTOR

BY John D. Husser
Robert W. Hampton
ATTORNEYS 3,462,054
Patented Aug. 19, 1969

3,462,054
MULTIPLE STRIP LEADER
Sanford Wayne Foor, Rochester, N.Y., assignor to Eastman Kodak Company, Rochester, N.Y., a corporation of New Jersey
Filed Mar. 20, 1967, Ser. No. 624,410
Int. Cl. G03b 1/02; B65h 17/00
U.S. Cl. 226—91                                             11 Claims

ABSTRACT OF THE DISCLOSURE

A leader for multiple strips or webs of material which is formed of flat, flexible material and which comprises a threading portion with guide edges for initial alignment with respect to a given feed path and at least two strip attaching portions which are laterally spaced and longitudinally staggered with respect to the direction of leader feed along the path so that the leading ends of several strips can be attached to the leader, concurrently threaded along the path in spaced lateral alignment and will emerge from the path at different times.

---

The present invention relates to a device for facilitating the concurrent feeding of two or more strips of material along a feed path, and more specifically to a leader for concurrently threading the leading ends of a plurality of strips of material along a predetermined path of feed in a manner which maintains the leading ends of the several strips in a laterally offset and longitudinally staggered relation so that the leading ends of the several strips will pass along and emerge from the feed path in proper alignment and with an interval between times of emergence of the respective strip ends from the feed path.

The term leader is used herein to refer generally to structure that is formed on, attached to or otherwise provided for an end of a strip of material. The term strip is used herein to refer to elongated lengths of material, whether coming from a roll or reel in web form or otherwise.

Such leaders have heretofore been used for facilitating the feeding of strip material in several different ways. In one prior art technique leaders have been provided for the ends of strips, of the type wound on reels, to facilitate the attachment of a strip end to the reel and/or to facilitate feed of the strip from the reel. Leaders of this general type have also been used to thread an end of strip material along a predetermined path of feed. One variety of threading leader is initially fed through the feed path, attached to the leading end of the strip and withdrawn to thread the strip on the feed path. Threading leaders have also been previously constructed which cooperate with other threading structure on the feed path, such as drive rollers and guides, in a manner such that the leader can be inserted in the feed path entrance and thereafter moved along the feed path bringing the attached strips therebehind. Such leaders are generally formed of a relatively stiff, yet flexible material so as to facilitate the threading operation.

In certain apparatus using the latter type strip feeding system, i.e., the self-threading type wherein the leader is fed through feed path, it is sometimes desirable to feed more than one strip along the feed path. Apparatus for chemically treating or otherwise processing strip material, in which the feed path is often long, provides an excellent example of the desirability of such multiple strip threading. By feeding more than one strip at a time through the treatment areas, considerable time, effort and expense can be eliminated.

Several problems exist when two or more strips are to be simultaneously threaded through such an apparatus. Firstly, the separate strips must each be initially aligned with the self threading structure of the apparatus in order to assure proper tracking of the strips along the feed path. Secondly, along certain portions of the feed path the fed strips are sometimes not positively supported against lateral movement with respect to the direction of feed and are therefore free to move in a manner which can cause overlapping, crossover or other entanglement of leading strip ends.

In such multiple strip handling apparatus, a problem was also found to exist when a plurality of the leading strip ends emerge simultaneously from the feed path, for the operator must then manipulate each strip end in some manner to provide for its subsequent take up or handling. It has therefore been found to be advantageous to have a time interval between the emergence of the leading ends of the different strips so that the operator has time to appropriately secure the leading end of each strip for takeup or to otherwise manipulate each end separately before the leading end of the next strip issues from the feed path.

In order to facilitate the threading and feed of two or more strips of material through such apparatus and to avoid the above-mentioned difficulties, a novel leader for attachment to the leading portions of each strip has been provided, which leader and its operation in conjunction with suitable self-threading strip handling apparatus form the subject of this invention.

In order to initiate proper lateral alignment of the strips with respect to the direction of feed, the leader of the present invention is formed with suitable aligning edges designed to cooperate with suitable guide structure at the inlet to the feed path.

The leader of the present invention also comprises separate predetermined areas suitable for the aligned attachment of the leading portions of respective strips thereto. The predetermined areas for attachment are spaced laterally with respect to the width of the leader, i.e., spaced with respect to the dimension of the leader which is perpendicularly transverse to the direction of leader movement along the feed path. The lateral spacing, or offsetting, of the attachment areas serves to prevent the problems of entanglement, mentioned above, and to assure that the strip will exit from the feed path in proper alignment with respect to the strip takeup apparatus or other structure provided at the feed path outlet.

The predetermined areas for attachment of the leader of the present invention are also staggered in a lengthwise or longitudinal direction on the leader, i.e., spaced at intervals along the dimension of the leader which is parallel to the direction of leader movement along the feed path. The longitudinally staggered locations of the attachment areas provide a time interval between the exit of the leading ends of the respective strips so that the operator can manipulate each strip for takeup or other subsequent operations.

The multiple strip leader of the present invention is hereinafter disclosed by way of example as used in conjunction with a photographic film processing apparatus of the self-threading type; however, it will be appreciated by one skilled in the art that the present invention is applicable to facilitate multiple strip threading and feeding in any strip handling apparatus.

It is therefore an object of the present invention to provide a novel device for facilitating multiple strip threading and feeding.

It is a further object of this invention to provide an improved leader which facilitates the concurrent handling of a plurality of strips in apparatus having a self-threading strip feed path.

Another important object of the present invention is to provide means for facilitating the properly aligned threading and feeding of a plurality of strips along a feed path.

Yet another object of the present invention is to provide means for facilitating the concurrent feed of a plurality of strips along a feed path in a manner which avoids overlapping and entanglement of the strips.

Still another object of the present invention is to provide means for facilitating the concurrent feed of a plurality of strips along a feed path in a manner which affords a time interval between the emergence of the leading ends of each of the plurality of strips from the feed path.

These and other objects will become readily apparent to those skilled in the art from the following description with reference to the drawings in which like characters denote like parts and wherein.

Figure 1:
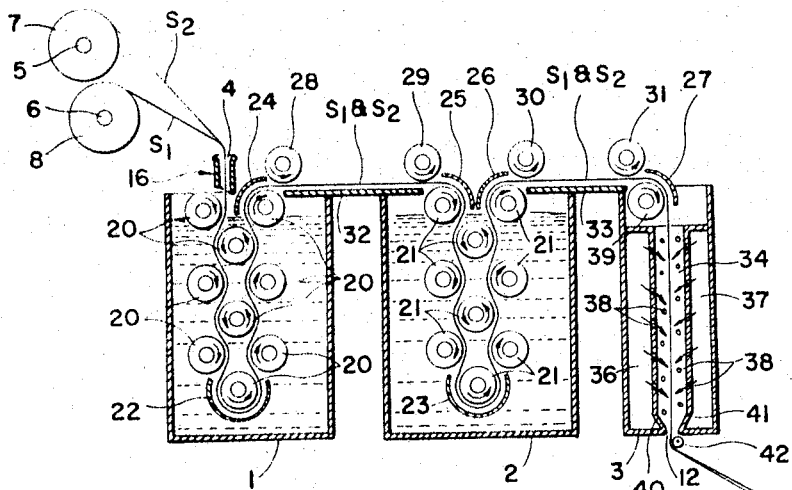
FIG. 1 is a sectional view through a multiple strip feeding and processing apparatus of a type in which the present invention can be used.
Figure 2:
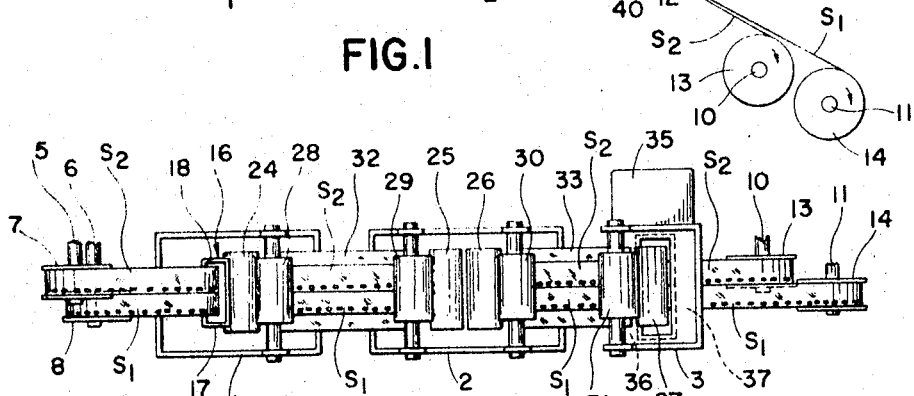
FIG. 2 is a top plan view of the apparatus illustrated in FIG. 1.

In FIGS. 1 and 2, apparatus is illustrated which is adapted for the concurrent treatment of a plurality of strips and which has a self-threading feed path of the type in which the novel multiple strip leader of the present invention can be utilized. The apparatus illustrated is a photographic film processor comprising first and second film treating tanks 1 and 2, respectively, and a film dryer unit 3. Supply spindles 5 and 6 are supported adjacent the treating tank 1 by suitable structure, not shown, for mounting a pair of film supply reels 7 and 8 in a laterally offset relation near a film inlet 4, as shown in FIG. 2. Film take up spindles 10 and 11 are supported by suitable structure (not shown) near a processor exit 12 for mounting film take up reels 13 and 14 in a correspondingly offset relation.

The film feeding mechanism of the processor is of the self-threading type and comprises an inlet guide 16 which includes lateral aligning edges 17 and 18 and which directs the strip material downwardly into engagement between a series of feed and tracking rollers. The rollers are of essentially the same type throughout the feed path and are designated 20 along the feed path in treating tank 1 and 21 along the feed path in treating tank 2. Each of the rollers 20 and 21 has a cylindrical driving surface and is mounted on a shaft for rotation by suitable drive means, not shown, in the directions indicated in FIGS. 1 and 2. U-shaped reversing guides 22 and 23 are located respectively at the bottom of the feed paths in treating tanks 1 and 2. Arcuate guides 24, 25, 26 and 27 are located on the feed path at the top of the treating tanks 1 and 2, and dryer 3 as shown in FIGS. 1 and 2. Crossover feed rollers 28, 29, 30 and 31 are also provided at the top of the treating tanks 1 and 2, and dryer 3 and cooperate with a pair of flat crossover guides 32 and 33 in the manner illustrated in FIGS. 1 and 2 to define the paths of feed between the tanks 1 and 2, and the dryer 3 unit respectively.

The dryer unit 3 comprises a dryer chamber 34 into which air is forced from dryer plenum 35 through air manifolds 36 and 37, and nozzles 38. A feed roller 39 is located at the top of the dryer unit, and guide members 40 and 41 are formed at the bottom of the chamber 34 defining the film exit 12 of the processor.

Strip material fed into the inlet 4 is therefore moved from the inlet 4 along a feed path through the treating tanks 1 and 2, and dryer 3 to exit 12 in the following manner. The strip material is inserted into the inlet guide 16, engaged and directed by rollers 20 down into treating tank 1, turned upwardly by U-shaped guide 22 and fed out of the processing tank 1 by the opposite rollers 20 as illustrated in FIG. 1. When the strip material moves to the top of tank 1, the arcuate guide 24 directs the material between crossover roller 28 and crossover guide 32 so that the material passes across guide 32, beneath roller 29 and is directed downwardly into treating tank 2 by arcuate guide 25. The material is then fed up and down within tank 2 by rollers 21 and guide 23 in the same manner as described with respect to treating tank 1. On passing out of tank 2, the material is fed across and into dryer 3 by guides 26, 33 and 27 and rollers 30 and 31 in the manner previously described. After leaving feed roller 39, the material passes through the dryer chamber 34 but is not positively supported. The material is directed through the dryer and out the film exit 12 by nozzles 38 and guides 40 and 41. The material can then be moved over roller 42 and attached to reels 13 and 14 for take up or otherwise directed for subsequent use.

It can be seen at this point that if means is not provided for initiating proper alignment of the separate strips which are to be concurrently fed through the above-described feed path, that misaligned tracking of these strips through the feed rollers could occur, resulting in overlap or crossover of the strips. Further, during the upsupported travel of the strips through dryer chamber 34, crossover and entanglement of the strips would be practically inevitable without a means for maintaining the relative lateral position of the leading ends of the strips. It will also be appreciated that if the leading ends of the strips emerge from the film exit at the same time, the operator will have difficulty in manipulating each of the ends for attachment to the take up reels or otherwise.

To avoid these difficulties and therby facilitate threading and feed of a plurality of strips concurrently, the novel multiple strip leaders illustrated in FIGS. 3 and 6 and hereinafter described, have been provided for use in the apparatus described above.

Figure 3:
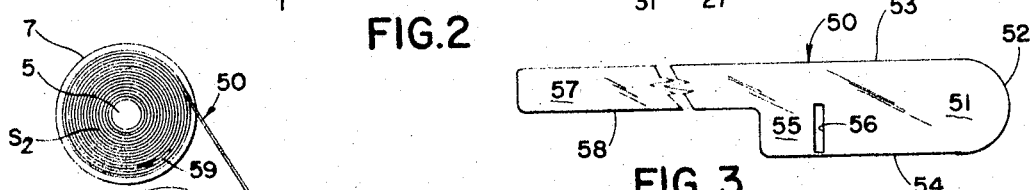
FIG. 3 is a top plan view of one embodiment of the novel multiple strip leader having a fragmentary section omitted.

In FIG. 3, one embodiment of the novel multiple strip leader of the present invention adapted for dual strand operation is illustrated. The dual strip leader designated generally 50 is constructed of flexible material such as, for example, a plastic material, but has a thickness sufficient to afford stiffness for facilitating threading between the drive and guide elements along a feed path such as is described above. The leader 50 is flat, having an outline which defines a main body portion with a tail portion extending from one side thereof as illustrated in FIG. 3. It can be seen that a portion of the leader tail has been omitted from FIG. 3 and in actual practice the tail is longer than is illustrated for a purpose hereinafter to be described.

The main body portion of leader 50 includes a threading portion 51 desirably formed with a rounded front end 52 to facilitate movement along the feed path. Parallel leader aligning edges 53, 54 are provided on opposite sides of the threading portion and are spaced so as to cooperate with other aligning structure such as aligning edges 17 and 18 (See FIG. 2) of the apparatus to facilitate initial alignment of the leader with respect to the feed path.

The main body portion of the leader also includes a first strip attaching portion 55 which is located rewardly from the threading portion 51. The attaching portion 55 is located laterally with respect to the centerline of the leader's main body portion on the half of the main body portion opposite from the rewardly extending tail portion. The width of the portion 55 is at least as great as the width of the strip to be attached thereon. A slot 56 is preferably formed in the first attaching portion 55 of the leader and extends therein perpendicular to the leader aligning edges 53 and 54. The slot 56 is of sufficient size to allow a strip to be passed therethrough.

The tail portion of the leader extends rewardly from the main body portion in a direction parallel to the aligning edges 53, 54 and, as pointed out above, from the lateral half of the main body portion opposite the first attaching portion. Near the end of the tail is located a second strip attaching portion 57 which is of a width at least as great as the strip to be attached thereto and which has a strip aligning edge 58 that is parallel to and intermediate the aligning edges 53 and 54 of the leader.

Figure 4:
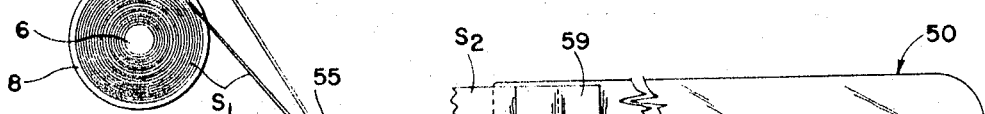
FIG. 4 is a top plan view of the leader illustrated in FIG. 3 and having strip material attached thereto.

By referring to FIG. 4, one suitable procedure for attaching the leading ends of film strips $S_1$ and $S_2$ to the leader 50 in a laterally spaced and longitudinally staggered relation can be seen. The leading end of strip $S_2$ is positioned on the second attaching portion 57 of the leader 50 with an edge parallel to strip aligning edge 58. The strip $S_2$ is affixed to the attaching portion 57 by adhesive strip 59; However, it will be appreciated that other suitable attaching means may be utilized and that structure, such as a slot like 56 in the first attaching portion, can be provided on the second attaching portion to facilitate attachment of the strip $S_2$ thereto. The leading end strip $S_1$ is inserted through slot 56 and aligned on the first strip attaching portion 55 of the leader 50 with one edge parallel to the edge 58 of the leader tail and therefore also parallel to edges 53 and 54 of the leader 50. The strip $S_1$ can be folded back on the other side of the leader as shown in FIGS. 4 and 5 or otherwise affixed to the leader 50, as for example, by adhesive tape.

Figure 5:
FIG. 5 is an enlarged side view of a portion of the apparatus illustrated in FIG. 1 with the feeding operation ready to commence and with the leader of FIG. 3 attached to the strips.

FIG. 5 illustrates how the leader 50 can be positioned with respect to the supply reels 7 and 8 to prepare for dual strip feeding. As can be seen in FIG. 5, the strip $S_2$ is attached to attaching portion 57 of the tail of leader 50 and the tail is thereafter wound onto the reel 7 a distance sufficient to dispose the first attaching portion 55 of the leader in position for the attachment strip $S_1$. After the leading end of $S_1$ has been aligned and attached, in this instance moved through the slot 56 and folded back, the reels 7 and 8 are placed on supply spindles 5 and 6 and the feeding operation is ready to commence.

To initiate threading and feed, the leader 50 is moved through film inlet 4 and the edges 17 and 18 of the inlet guide 16 cooperate with the aligning edges 53 and 54 of the leader 50 to properly locate and align the leader 50 with respect to the feed path of the apparatus illustrated in FIGS. 1 and 2. The threading portion 51 of the leader 50 is thereafter engaged by the feed rollers 20 and moved along the feed path in the manner previously described. Strip $S_1$ follows closely behind the threading portion 51 of the leader 50 and is threaded through the feed path. It is to be noted that the stiffness of the leader 50 serves to facilitate the initial threading since film strips are sometimes more flexible and could, in such instances, create difficulties if fed through the feed path without support.

As the threading portion 51 of the leader and strip $S_1$ are moved along the feed path, the rail portion of the leader 50 unwinds from supply reel 7 so that the leading end of the strip $S_2$ attached to portion 57 of the leader is subsequently drawn into the feed path in a properly aligned relation.

It can be seen, therefore, that the novel leader of the present invention will thread both strips $S_1$ and $S_2$ through the feed path in predetermined lateral alignment with respect to the leader 50 and to each other thus preventing overlap and entanglement of the strips $S_1$ and $S_2$ during movement along the feed path, particularly during passage through the dryer chamber 34.

It will also be appreciated that due to the staggered location of the strip attaching portions 55 and 57 of the leader, the leading end of strip $S_1$ will emerge from the exit 12 before the leading end of strip $S_2$ so that the operator will have adequate time to attach the strip $S_1$ to the take-up reel 14 before strip $S_2$ emerges.

Figure 6:
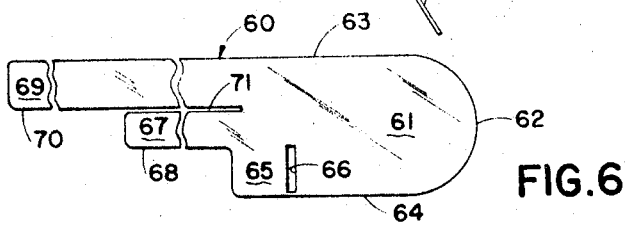
FIG. 6 is a top plan view of another embodiment of the novel multiple strip leader having fragmentary sections omitted.

FIG. 6 illustrates another embodiment of a multiple strip leader 60 in accordance with the present invention. The leader 60, as illustrated in FIG. 6, is constructed so as to facilitate threading and feeding of three separate strips concurrently. It can be seen that the leader 60 has a threading portion 61 with a rounded front end 62 and aligning edges 63 and 64 which are similar to the dual strip leader 50 of FIG. 3; however, it will be noted that the distance between edges 63 and 64 is at least as great as three strip widths so as to accommodate the two tail portions provided in this embodiment. The leader 60 has a first strip attaching portion 65 with an attaching slot 66 such as was described above with respect to the leader of FIG. 3. Two tail portions are provided on the three strip leader 60, each extending from the main body portion of the leader 60 in a laterally spaced relation with respect to each other and the first strip attaching portion 65. Second and third strip attaching portions 67 and 69 are provided near respective ends of the two tail portions of leader 60. Strip aligning edges 68 and 70 are also provided on each of the second and third strip attaching portions and as can be seen in FIG. 6, the two tail portions are separated by a slit 71 which extends therebetween up to the main body portion of leader 60.

It can therefore been seen that the leading ends of three separate strips can be respectively attached to the portions 65, 67 and 69 of leader 60 in the manner described with respect to the dual strip leader of FIG. 5. After rolling the leader tails with the attached strip ends back onto the two supply reels and mounting the three reels on the appropriately located supply spindles, aligned threading and feed of three strips concurrently, can be achieved in a manner similar to that described above with respect to the dual strip operation. The width of the threading portion 61 of the leader can, of course, be designed to cooperate with suitable inlet guide structure so as to provide initial positioning and alignment of the leader with respect to the feed path.

It will also be appreciated that it is within the scope of the present invention, if desired, to provide an improved leader capable of facilitating feed of more than three strips in laterally spaced and longitudinally staggered relation through the feed path of such self threading strip handling apparatus by enlarging the overall leader width and providing appropriate tail portions of staggered lengths in a manner similar to that described with respect to FIGS. 4–6.

The invention has been described in detail with particular reference to preferred embodiments, but it will be understood that variations and modifications can be effected within the scope and spirit of the invention described hereinabove.

I claim:

1. A leader for directing at least first and second separate strips along a feed path, comprising a piece of flexible material having:

(a) A main body portion having a pair of opposed substantially parallel edges spaced in a widthwise direction a distance at least as great as the total widths of the separate strips to be directed thereby and extending along at least a portion of the longitudinal dimension thereof for aligning said leader with respect to said feed path;
(b) a first strip mounting portion on said main body portion having first means for mounting a leading end of the first strip with a longitudinal edge thereof parallel to and adjacent one of said opposed edges of said main body portion; and
(c) at least one tail portion spaced in a widthwise direction from said first strip mounting portion and extending from said main body portion in a direction parallel to the opposed edges of said main body portion so as to provide a second strip mounting portion having second means for mounting one leading end of the second strip offset in a widthwise direction and staggered in a longitudinal direction from said first mounting portion.

2. The invention defined in claim 1 wherein said tail portion has substantially parallel longitudinal edges and is of a width substantially equal to that of the second strip so that said tail portion can be wound with the second strip on a supply reel.

3. For use with an apparatus for threading a plurality of strips from their respective supply reels along a feed path in a laterally offset relation, a leader of flexible material for attachment to the leading ends of the strips comprising:
(a) a threading portion of overall width not less than the total widths of the separate strips to be threaded thereby and having parallel guide edges located on the opposite longitudinal sides thereof for aligning said threading portion with respect to the feed path;
(b) a first strip mounting portion located on a surface of said threading portion and having first means for mounting a leading end of one of said plurality of strips with a longitudinal edge thereof adjacent and substantially parallel to one of said guide edges; and
(c) at least one tail portion spaced in a widthwise direction from said first strip mounting portion and extending from said threading portion in a direction parallel to said guide edges so as to provide at least one other strip mounting portion having second means for mounting another strip, said other strip mounting portion being laterally offset and spaced in a longitudinal direction from said first strip mounting portion,
whereby the strips attached to said leader are maintained in an aligned, laterally spaced relation during feed along said path and a predetermined time interval is provided between the emergences of the leading strip ends from the feed path.

4. The invention defined in claim 3 wherein said tail portion has longitudinal edges parallel to said guide edges and is a width substantially the same as that of the strip attached thereto so that said tail portion can be wound on the strip supply reel.

5. A device for directing a plurality of webs along a feed path in predetermined lateral alignment with respect to the direction of feed along the feed path comprising:
(a) a threading portion including a length of flexible material which can be engaged by suitable feed means located adjacent the feed path for moving said device along the feed path and having a pair of opposed longitudinal guide edges which are parallel with respect to the direction of movement of said device along the feed path for initially positioning and aligning said device with respect to said feed path;
(b) a first web mounting portion connected to said threading portion having first means for mounting the leading end of one of said webs with the longitudinal edges of said web substantially parallel to said guide edges; and
(c) at least one other web mounting portion connected to said threading portion having second means for mounting the leading end of another of said webs in a position which is laterally offset from said web.

6. The invention as defined in claim 5 wherein:
(a) said first web mounting portion is formed as a part of said threading portion adjacent one of said guide edges; and
(b) said second web mounting portion comprises a tail of width substantially equal to the web to be attached thereto, which tail extends in a direction substantially parallel to said guide edges from a location on said threading portion which is spaced laterally with respect to said first web mounting portion.

7. A leader for concurrently threading the leading ends of at least two strips along a feed path in a laterally aligned and longitudinally staggered relation with respect to the direction of feed, comprising:
(a) a main body portion comprising a length of flexible material having a width at least as great as the total of widths of the strips to be threaded thereby and with parallel longitudinal sides thereof forming guide means for aligning said leader with respect to the feed path;
(b) a first strip attaching portion located adjacent one of said sides having first means for attaching one of the strips in a parallel relation with respect thereto; and
(c) a tail portion extending from said main body portion at a location laterally spaced from said first attaching portion and in a direction substantially parallel with respect to said longitudinal edges, said tail portion being of width substantially equal to the width of the strip attached thereto;
(d) a second strip attaching portion formed on said tail portion at a location which is longitudinally spaced from said first strip attaching portion, and having second means for attaching another of the strips.

8. The invention defined in claim 7 wherein said first means comprises a slot of dimension sufficient to allow one of said strips to be inserted therethrough for attachment to said leader.

9. The invention defined in claim 7 wherein said main body portion includes a threading portion formed between said longitudinal sides thereof and wherein the end of said main body portion opposite said first attaching portion is rounded to facilitate threading of said leader.

10. A leader for directing at least first and second separate strips along a feed path, comprising a piece of flexible metal having:
(a) a main body portion having a pair of substantially parallel edges spaced in a widthwise direction a distance at least as great as the total widths of the separate strips to be directed thereby and said edges extending along at least a portion of the longitudinal dimension of said main body portion for aligning said leader with respect to the feed path;
(b) first means for mounting a leading end of the first strip with a longitudinal edge of the first strip parallel to and adjacent one of said edges of said main body portion;
(c) at least one tail portion extending from said main body portion in a direction substantially parallel to said edges of said main body portion; and
(d) second means for mounting a leading end of the second strip in an offset relation along the widthwise direction, and in a staggered relation along the longitudinal direction, with respect to the first strip.

11. In combination, at least first and second strips; a leader made of a flexible material for directing said first and second strips along a feed path, said leader having a body member having a pair of opposed, substantially parallel edges extending along at least a portion of the longitudinal dimension of said body member for aligning said leader with respect to the feed path; first means on said leader for mounting a leading end of said first strip with a longitudinal edge of said first strip parallel to and adjacent one of said opposed edges of said body member; and second means on said leader for mounting a leading end of said second strip in an offset relation along a widthwise direction and in a staggered relation along a longitudinal direction with respect to said first strip.

References Cited

UNITED STATES PATENTS

| | | | |
|---|---|---|---|
| 3,127,079 | 3/1964 | Allander | 226—92 |
| 3,167,266 | 1/1965 | Stibitz | 226—92 X |
| 3,208,682 | 9/1965 | Pastor | 226—91 X |
| 3,321,752 | 5/1967 | Peterson | 226—109 X |

M. HENSON WOOD, Jr., Primary Examiner

R. A. SCHACHER, Assistant Examiner

U.S. Cl. X.R.

352—235